(12) United States Patent
Kastrup et al.

(10) Patent No.: US 10,890,163 B2
(45) Date of Patent: Jan. 12, 2021

(54) TRANSPORT FRAME FOR A WIND TURBINE BLADE

(71) Applicant: Vestas Wind Systems A/S, Aarhus N. (DK)

(72) Inventors: Michael Kastrup, Ebeltoft (DK); Lucia Quintana, Aarhus N (DK); Adrian Botwright, Sabro (DK); Troels Vahle, Grenaa (DK); Martin Damm, Aarhus N. (DK); Kristoffer Lolk Fredriksen, Aarhus N. (DK); Carsten Jasper, Aarhus N. (DK)

(73) Assignee: Vestas Wind Systems A/S, Aarhus N. (DK)

( * ) Notice: Subject to any disclaimer, the term of this patent is extended or adjusted under 35 U.S.C. 154(b) by 112 days.

(21) Appl. No.: 16/066,722

(22) PCT Filed: Dec. 23, 2016

(86) PCT No.: PCT/DK2016/050468
§ 371 (c)(1),
(2) Date: Jun. 28, 2018

(87) PCT Pub. No.: WO2017/114533
PCT Pub. Date: Jul. 6, 2017

(65) Prior Publication Data
US 2019/0010930 A1    Jan. 10, 2019

(30) Foreign Application Priority Data

Dec. 30, 2015 (GB) .................................. 1523121.0

(51) Int. Cl.
*F03D 13/40* (2016.01)
*B60P 3/40* (2006.01)
*B63B 25/28* (2006.01)

(52) U.S. Cl.
CPC ................ *F03D 13/40* (2016.05); *B60P 3/40* (2013.01); *B63B 25/28* (2013.01); *Y02E 10/72* (2013.01)

(58) Field of Classification Search
CPC .......... F03D 13/40; F03D 80/00; F03D 13/10; F03D 13/20; F03D 1/00; F03D 1/0675; F03D 80/50; F03D 13/35
(Continued)

(56) References Cited

U.S. PATENT DOCUMENTS 6,582,196 B1 * 6/2003 Andersen .............. F03D 1/0608
  415/4.3
7,713,007 B2 * 5/2010 Kootstra ................... B60P 3/40
  410/44

(Continued)

FOREIGN PATENT DOCUMENTS

CN    101648539 A    2/2010
CN    104066974 A    9/2014

(Continued)

OTHER PUBLICATIONS

Intellectual Property Office, Search Report in GB1523121.0, dated Jul. 11, 2016.

(Continued)

*Primary Examiner* — D Glenn Dayoan
*Assistant Examiner* — Sunsurraye Westbrook
(74) *Attorney, Agent, or Firm* — Wood Herron & Evans LLP

(57) ABSTRACT

A transport frame having a longitudinal, lateral and upright extent for receiving a tip portion of a wind turbine blade is disclosed. The frame is stackable with identical frames and has a tip saddle assembly including a saddle with a support surface shaped to receive a blade tip, and a clamping mechanism having a hinged clamping arm operable between (Continued)

an open position and a closed position, the clamping arm, when open, allowing a blade tip to be lowered into the saddle, and when closed, securely restraining the blade tip against upward movement. The tip saddle assembly further includes a preventer serving to maintain the clamping arm in the closed position over a blade. A method of using the transport frame to clamp a wind turbine blade is also disclosed.

25 Claims, 6 Drawing Sheets

(58) Field of Classification Search
USPC ........ 410/44, 45, 120, 2, 47, 98, 97, 91, 87; 414/800, 470, 458, 460, 485, 910, 803, 414/775
See application file for complete search history.

(56) References Cited

U.S. PATENT DOCUMENTS

| | | | |
|---|---|---|---|
| 7,967,336 B2 * | 6/2011 | Biseli ................. | B60R 9/06 180/219 |
| 2005/0031431 A1 * | 2/2005 | Wobben .............. | B60P 3/40 410/45 |
| 2006/0144741 A1 * | 7/2006 | Wobben .............. | B60P 3/40 206/477 |
| 2007/0253829 A1 * | 11/2007 | Wessel ............... | F03D 80/00 416/244 R |
| 2008/0198007 A1 * | 8/2008 | Chi-Jung ............ | G08B 25/14 340/540 |
| 2008/0296197 A1 | 12/2008 | Kootstra | |
| 2009/0274529 A1 | 11/2009 | Broderick et al. | |
| 2011/0142660 A1 * | 6/2011 | Bakhuis ............. | B60P 3/40 416/223 R |

FOREIGN PATENT DOCUMENTS

| | | |
|---|---|---|
| EP | 2418376 A1 | 2/2012 |
| EP | 2620389 A1 | 7/2013 |
| EP | 2708731 A2 | 3/2014 |
| EP | 2796709 A1 | 10/2014 |
| JP | 2008128253 A | 6/2008 |
| JP | 2011521156 A | 7/2011 |
| WO | 2005005286 A1 | 1/2005 |
| WO | 2009141018 A2 | 11/2009 |
| WO | 2014064247 A1 | 5/2014 |
| WO | 2015149805 A1 | 10/2015 |
| WO | 2015149809 A1 | 10/2015 |

OTHER PUBLICATIONS

European Patent Office, International Search Report and Written Opinion in PCT/DK2016/050468, dated Mar. 31, 2017.
Japanese Patent Office, Notice of Reasons for Refusal in JP Application No. 2018/534856, dated Aug. 1, 2019.
China National Intellectual Prpoerty Administration, First Notification of Office Action in CN Application No. 201680082842.3, dated Jul. 22, 2019.
Vestas Wind Systems, Transport System for Transporting of Rotor Blades, Complete Specification, Form 2, undated.
Japanese Patent Office, Nitification of Reasons for Refusal in JP Application No. 2018-534856, dated Feb. 17, 2020.

* cited by examiner

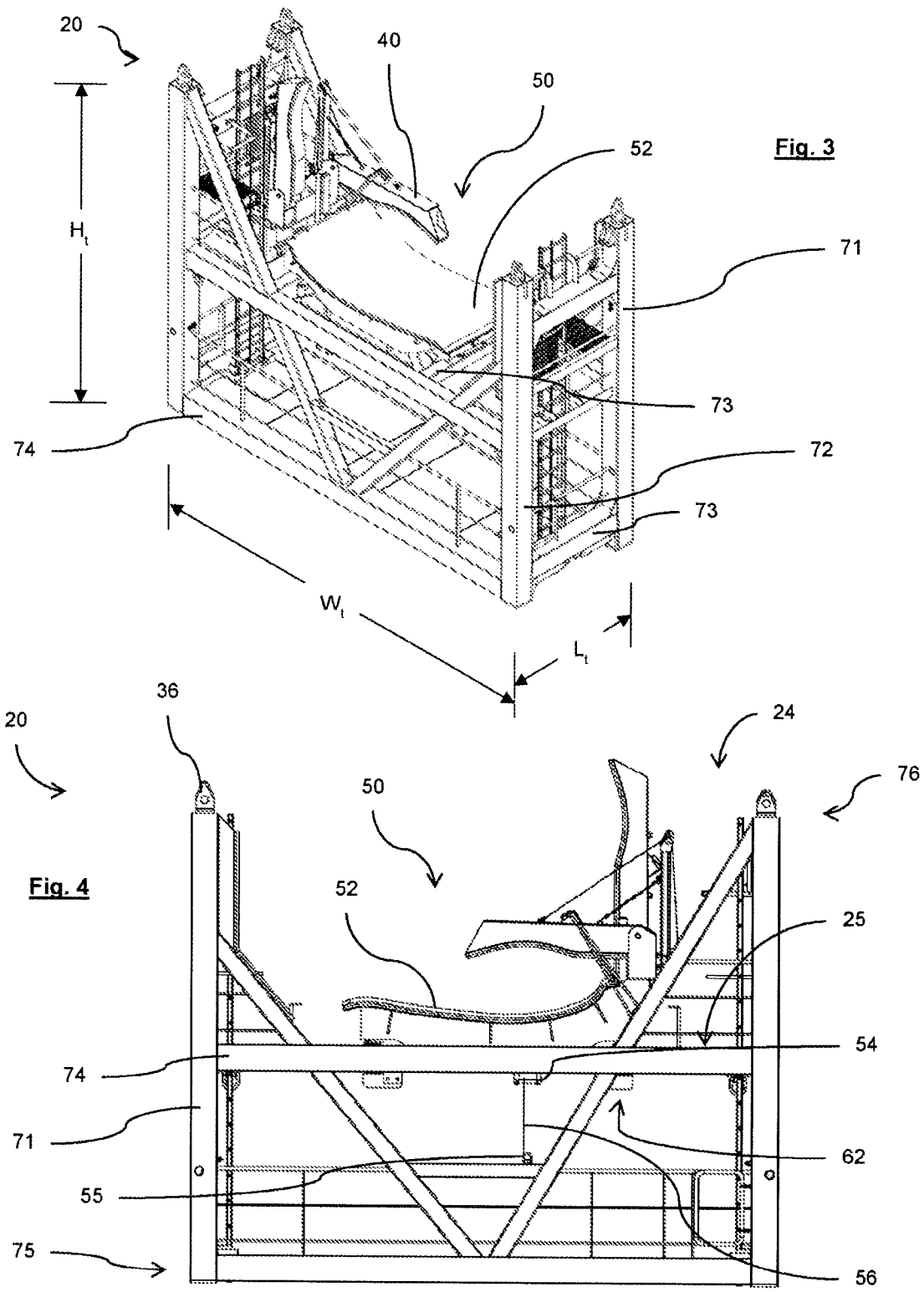

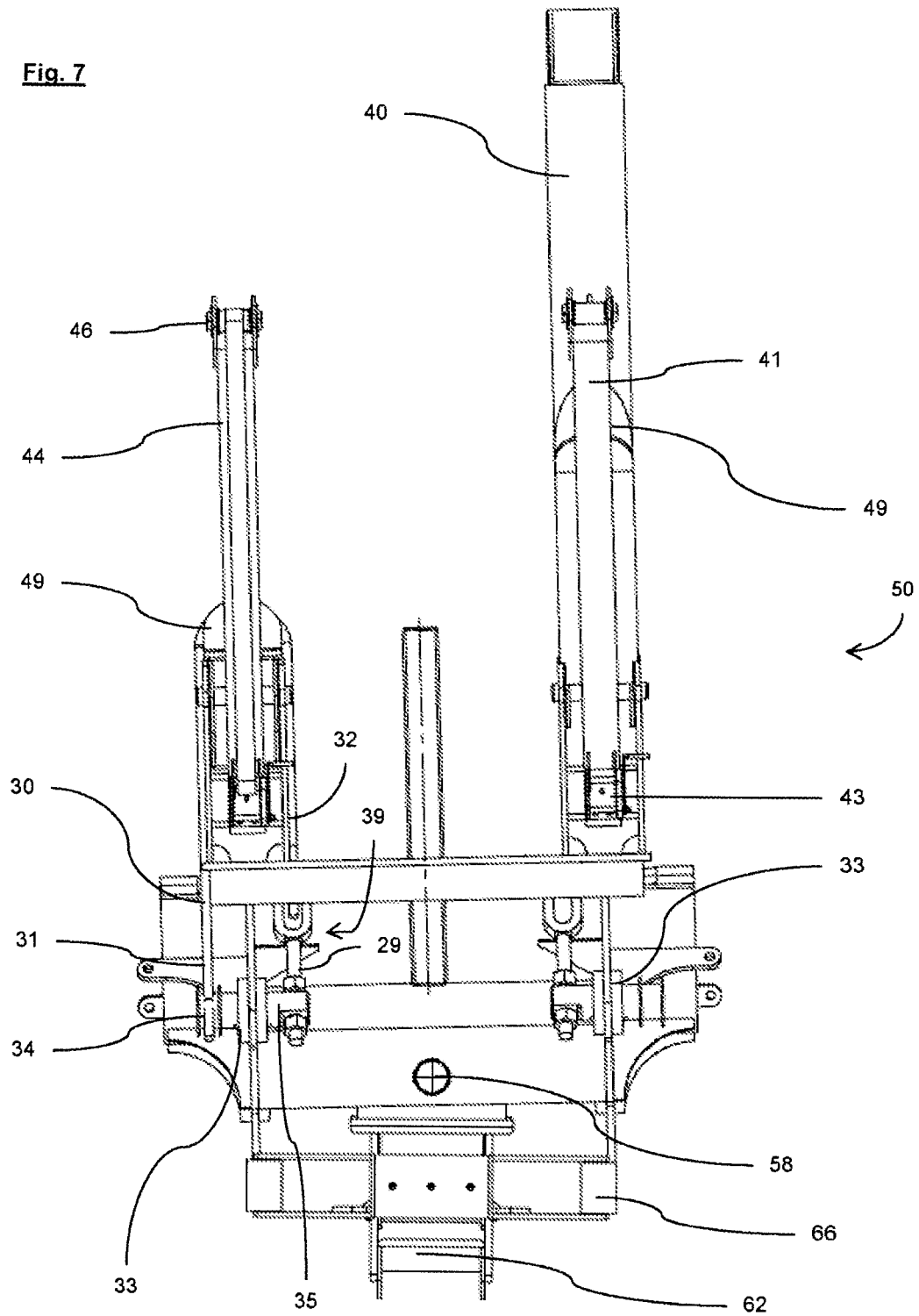

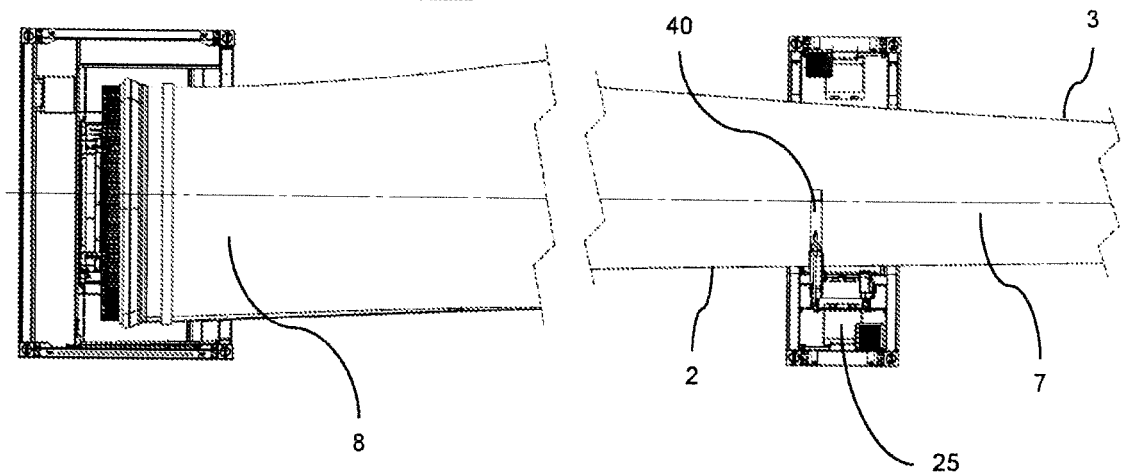
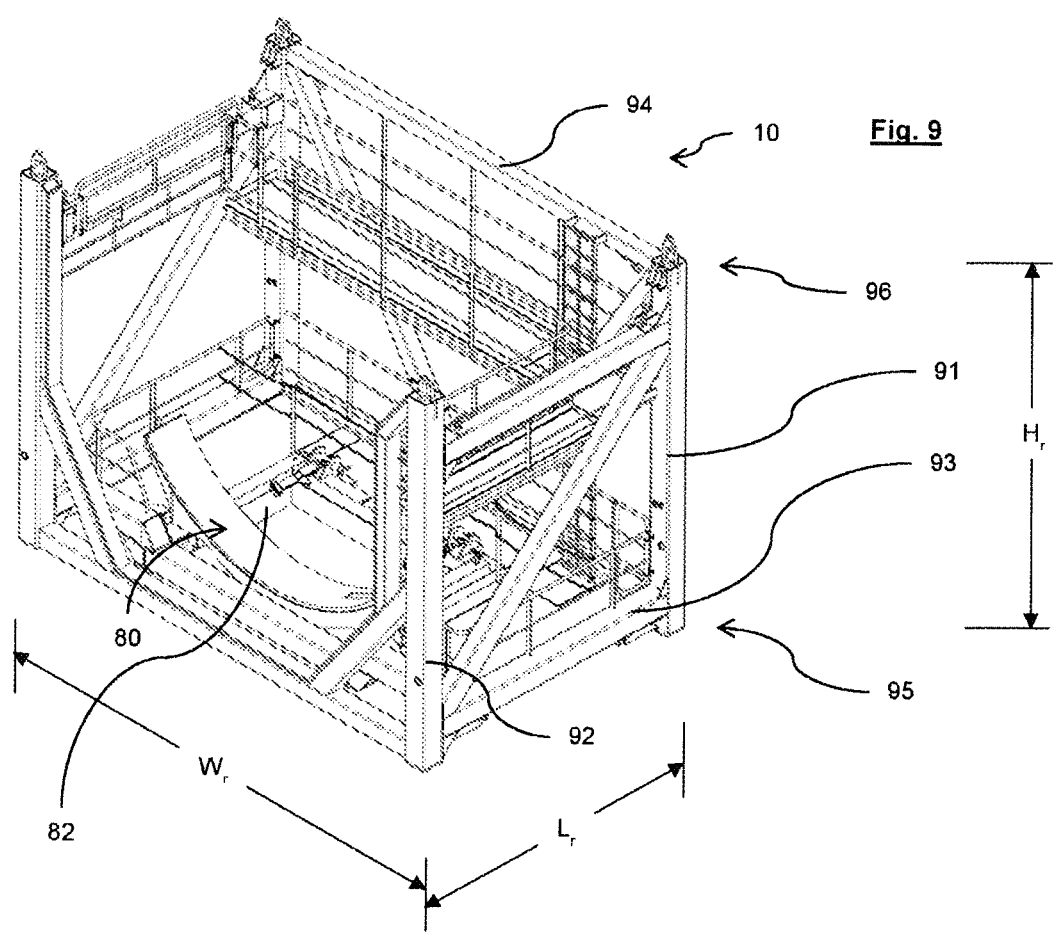

TRANSPORT FRAME FOR A WIND TURBINE BLADE

The present invention relates to the field of storage, transportation and handling of large elongate objects, in particular wind turbine blades.

In this context, a special set of logistical requirements interacts with a wide variety of technical and cost constraints, to pose technical challenges for effective or optimal solutions. The ever-increasing size and weight of individual blades adds to these challenges. In general, it may be said that after their construction, wind turbine blades undergo a series of handling and storage stages from their production site to their installation location. These stages may include initial storage at a production site, transportation from a production site to an installation site or to an interim storage or marshalling site. There may be further transportation between one or more interim storage or marshalling sites to an installation site. Each interim storage stage may include transferring steps in which blades are lifted off a first transportation platform and on to another, or transfers in and out of storage locations between successive transport steps. One or more transport stages may include sea transport, or rail or truck transport. Storage and handling solutions are sometimes optimised for individual stages of the transition between production and installation. To that end, there may be provided a whole range of support or storage solutions, each individually configured for a particular storage or transport stage and requiring repeated switching between different storage or transport structures. This is costly, time-consuming and can increase the tendency to inflict damage or wear on blades. There can be many advantages arising from devising a blade transport and handling solution which facilitates handling at multiple stages of the transportation process as a whole, including interim storage stages.

The present invention seeks to provide an effective wind turbine blade transport and handling solution which addresses the needs to ensure damage-free transportation of the blades, quick handling during transfers whether between transport platforms or between storage and transportation stages, as well as safety and ease of use by personnel. In aspects, special consideration has been given towards transportation by shipping. In aspects, special consideration has been given towards both ensuring secure retention and support of offshore or onshore blades in transport frames and to simplifying operations and procedures.

Wind turbine blade support and transportation devices are known in which a blade is placed in a frame element at a blade root while another co-operating frame element is provided outboard of a blade root region, often in a mid- or tip region. These may be referred to as root- and tip frames respectively. In some cases, these may be stackable thereby allowing several blades to be supported lying more or less horizontal or slightly inclined, and stacked atop one another. EP2708731 recites stackable wind turbine blade frames in which each frame is provided at its upper and lower corners with ISO container corner castings. These ensure that the transport frames can be lifted. Moreover, it is known in the art to stack containers atop one-another, in particular using twistlock elements interposed between adjacent corner castings in a stack. This document discloses a root and tip frame pair in which a planar root frame supports a cross-shaped rotatable root-brace. The tip frame comprises a blade-holding surface slidably supported on a belt which forms a cradle between first and second ends respectively connected to opposing tip sides of the tip frame. That arrangement allows a blade, supported in the fame pair, to be rotated around its longitudinal axis and thereby to be brought into different pitchwise orientations.

EP2796709 discloses transport and storage fittings for a wind turbine blade with a set of root and tip storage fittings for storing a blade in one pitch orientation. A further set of root and tip transport frames is provided, configured to receive the blade, together with its storage fittings nested inside the transport frames. The tip and root storage fittings can be accommodated in respective transport frames at an angle offset by approximately ninety degrees to the storage orientation.

WO2015149809 discloses a stackable frame arrangement in which the tip- and root frame each allows a lateral tilting of a respective root or tip support element, thereby accommodating a possible height difference between the level of the tip frame and the level of the root frame. The tip frame includes a cradle for receiving a blade spanwise portion and with a clamp arm hinged at one side of the cradle and with a closure mechanism at the other side of the cradle.

The present invention sets out to provide improvements to known blade transport frames.

SUMMARY OF THE INVENTION

To these and other ends, a transport frame according to the invention is defined in appended claim 1. Further preferred, optional features thereof are defined in subclaims 2-17. Additional features are described or defined throughout this specification or shown in appended drawings.

The present invention provides a transport frame having a longitudinal, lateral and upright extent, and being configured for receiving a tip portion of a longitudinally extending wind turbine blade. The frame is in particular securely stackable with identical frames. It comprises a tip saddle assembly including a saddle with a support surface shaped to receive a blade mid- or tip portion with its chordwise extent lying approximately horizontal. The tip saddle assembly includes a clamping mechanism having a hinged clamping arm configured to be operable between a raised, open position and a lowered, closed position. A clamping arm preferably exhibits a blade clamping surface which is conformed to a surface of a said wind turbine blade.

The clamping arm, when open in a raised, preferably upright extending position, allows a blade tip to be lowered onto the saddle with its chordwise extent generally horizontal, and when closed, securely restrains the blade tip against upward movement. The clamping arm extends between a hinge point and a free end. The hinge point is provided at the saddle assembly.

The tip saddle assembly of the invention further includes a preventer serving to maintain the clamping arm in its closed position over a blade and which preventer has a middle portion extending between a first end and a second end. The preventer may be in the form of a strop or looped strop. It may comprise a cord or a strap or cable or rope or other equivalent. It may preferably be made from a high tensile strength material such as a metallic material or high strength polymer material or other equivalent. Suitable materials include polyaramid materials or UHMPE.

The tip frame further includes a preventer fixing for respective first and second ends of the preventer. Preferably, the preventer fixing may be located at said tip saddle assembly. The fixing may comprise a single anchor point for both first and second ends of the preventer or a said preventer fixing may comprise a respective separate anchor point for each end of the preventer. An anchor point in this context may be a fixing point for securing a relevant end of the preventer. In embodiments, it may be a tensioning point or fulcrum, over which a respective end of a preventer may pass. According to the invention, the tip saddle assembly is configured such that said preventer exerts a downward force on the clamping arm when a middle portion thereof passes under tension over a portion of the clamping arm between the hinge point and its free end when the preventer is anchored at its first and second ends to the transport frame, in particular to the tip saddle assembly thereof, in particular, to a preventer fixing at said tip saddle assembly.

It may occur, especially during shipping, that upward or downward acceleration of the vessel, due in particular to waves, may impart considerable forces on a blade saddle assembly. When transporting especially heavy blades, these may exhibit a tendency to break open a closed clamping element thereby leading to considerable damage or risk of injury. Therefore, the transport frame of the invention mitigates against accidental opening of the clamping arm e.g. during transportation, in part due to its clamping arm which not only closes over a blade in the saddle but which additionally comprises a tensionable element in the form of a preventer.

The preventer may preferably comprise a tensioner capable of applying tension thereto when its first and second ends are respectively fixed. Preferably a tensioner for tightening said preventer may be positioned proximate to said clamp arm hinge point. Preferably said tensioner may be actuated by an operator nearby said clamping arm hinge point. In this way, the transport frame may be easily operated, as much in respect of closing or opening said clamping arm or applying tension to the preventer.

In embodiments, the tip saddle assembly may comprise two or more said clamping arms spaced in a lengthwise direction of the frame. In this context, a lengthwise direction of the tip frame coincides with or extends parallel to a lengthwise direction of a blade supported therein.

According to this embodiment, each clamping arm may preferably be associated with a respective preventer and a respective preventer fixing. It is not excluded that each clamping arm may be substantially identical. It is preferred for each clamping arm to be provided with all the same operating elements.

In embodiments, the tip saddle assembly may advantageously be freely movable in translation relative to the frame, in a lengthwise direction of the frame. Such an arrangement may assist in preventing lengthwise forces on the blade, for example arising during transportation e.g. by shipping, from being transmitted to the tip frame or to a stack of tip frames. Alternatively, in embodiments, the tip saddle assembly may be provided in fixed relation to the tip frame and not moveable relative thereto.

Preferably, the clamping arm has a boss on an upper surface thereof between the clamping arm hinge point and its free end. The boss may for example be in the form of a raised portion or part of a groove. The boss may be configured to receive a middle portion of the preventer and to retain it in place when the preventer is under tension.

In a further optional aspect, a preventer fixing for said preventer may be located at the tip saddle assembly proximate and preferably below the hinge point. Preferably, the preventer fixing may be provided in fixed relation to the tip saddle. In embodiments in which the tip saddle assembly is fixed in relation to the transport frame, preventer fixings may be fixed to the frame itself, preferably nearby said hinge point. In embodiments, the fixing may be in the form of a bollard, or equivalent fixture, preferably rigidly fixed to the tip saddle assembly. Such a bollard or other fixture may have at least a first and a second trunnion, each for securing a first or second end of a preventer.

Optionally, an alternative and equivalent arrangement may provide for the preventer to pass around a heaving point proximate the hinge point, and thereafter to a preventer fixing which may for example include a tensioner. By way of example, a tensioner may form part of a preventer fixing or it may ride on the preventer itself, or a combination of the two. Therefore in aspects, a tensioner may comprise a tightening mechanism at the preventer fixing of the tip saddle assembly. A tensioner may preferably be manually operable, preferably without requiring power tools. In one aspect, a tensioner may be provided in the form of a threaded bolt with a catch capable of engaging a free end of a preventer. The threaded bolt may be received at a preventer fixing, such that a tightening action of a nut element may draw the threaded bolt such as to apply tension to the preventer. The preventer may be loosened by an opposite action. Preferably, a tightening action or releasing action of a tensioner may be carried out manually by an operator. Preferably without the use of power tools. In alternative embodiments, tension may be applied to the preventer using a tensioner interposed along the length of the preventer. In one example such a tensioner may be a ratchet lever. Preferably a manually operated ratchet lever, without requiring power tools.

Preferably, a preventer fixing may comprise a first and second anchor point for respective first and second ends of a preventer. Optionally therefore, the first end of the preventer may be fixable at a first anchor point while the second end of said preventer may be fixable at a second anchor point preferably additionally provided with an adjustable tensioner. Either or both anchor points may be comprised as part of a preventer fixing proximal said clamping arm hinge point. Preferably, an adjustable tensioner may be provided nearby said clamping arm hinge point. Preferably, said preventer fixing may be provided at said tip saddle assembly. Alternatively, said preventer fixing may be provided at said frame—notably, in particular embodiments in which said tip saddle assembly may be in fixed relation to said frame. Preferably therefore, the second end of the preventer may be adjustably fixed at a second anchor point at the tip saddle assembly. Alternatively, the second end of the preventer may be adjustably fixed at the frame, in embodiments in which the tip saddle assembly is in fixed relation to the frame.

In embodiments, a preventer fixing according to the invention may comprise a respective first and second anchor point for each first and second end of the preventer or it may comprise a single anchor point for both ends.

In preferred aspects, the tip frame or in particular the tip saddle assembly may comprise a mechanism for raising or lowering the clamping arm by means of a preferably manually operated cable winding device of the clamping mechanism. In embodiments comprising two clamping arms at a tip saddle, there may be provided two such winches, one associated with each clamping arm.

Optionally, a winch cable may run from a winch up over a raised runner such as a pulley wheel and then descend to an attachment point on the clamping arm. In aspects, the said cable may be any rope or chain or equivalent flexible line. Optionally, said raised runner may be positioned atop an arm or post, preferably fixed at its base to the tip frame or tip saddle assembly.

Preferably, a lowering action of the clamp arm may be driven by gravity. In this way, manual operation of the lowering of the clamping arm is facilitated, without the need for powered apparatus. In addition, a raising of the clamping arm may be carried out manually by an operator using a said winch, in particular, an operator positioned at an operator platform proximate said hinge point. Hence, in aspects, said cable winding device, in particular said winch, may be located proximate said clamping arm hinge point.

The clamping arm may have considerable weight for the purpose of reliably enabling manual lowering into a closed position, in particular enough to overcome the effect of friction resistance to movement in its winch or hinge system. Still preferably, a clamping arm may be shaped such that, when in its fully raised position, its centre of gravity lies vertically outboard of its hinge point in a direction towards the saddle. Preferably, a clamping arm hinge point may lie proximate a leading edge position of a blade in said saddle. Preferably therefore, the centre of gravity of a said clamping arm, when in its fully raised position, lies at a position vertically outboard of said hinge point, in a direction towards a trailing edge position of a blade in said saddle.

In aspects, the tip frame may additionally comprise an operator access platform. Preferably, an operator access platform may be located proximate to said hinge point. Advantageously therefore, in aspects of the invention, an operator positioned at said platform may readily close or open a clamping arm and/or put in place and tighten a preventer tensioner—or release the same. This may considerably facilitate operational tasks connected with transferring blades into or out from the frame. Preferably a preventer fastener may be tensioned by an operator at said platform. Preferably a clamping arm winch may be operated by an operator standing at said platform, in particular, at an operating position thereof.

In addition, optionally, a flexible guy may run down to a fixing point on the clamping arm to prohibit a lowering of the clamping arm below a predetermined level or angle. Preferably, the guy may be fixed at a first end to the transport frame or to a tip saddle assembly thereof. Preferably, the guy may be fixed at a second end to the clamping arm. Preferably, the guy, at a first end, may be fixed to a same raised arm which supports a clamping arm cable winding device, or winch. Preferably the guy may be inextensible. Preferably, the guy may be of or comprise a metallic or high tensile strength polymer material. Optionally the guy may comprise a chain.

Preferably, the free end of each clamping arm, when the clamping arm is in a closed position, e.g. closed over a blade, reaches across less than the full chordwise extent of the said saddle or blade. The clamping arm is thereby comparatively compact. Preferably, the free end of the clamping arm reaches over the maximum thickness extent of a blade in said saddle. Preferably, the clamping arm extends between 40% and 80% of the chord dimension at said saddle. Still preferably, the clamping arm extends between 45% and 70% of the chord dimension at said saddle. Still more preferably, the clamping arm extends between 50% and 60% of the chord dimension at said saddle.

Where more than one clamping arm is provided, it is preferred for each clamping arm to be equipped, fitted and operable in the same way or in substantially the same way as the clamping arm described herein.

In a further aspect, a method according to the invention is defined in appended claim 18. Further preferred features thereof are defined in appended subclaims 19-24 and are discussed in this specification.

According to the method, there is provided a method for clamping a mid- or tip-region of a wind turbine blade in a transport frame according to the invention. The method includes
- placing the clamping arm in its open position,
- placing a portion of a wind turbine blade on the tip saddle,
- lowering the clamping arm over the blade, preferably under the action of gravity,
- connecting or fixing a first end of the preventer at a first anchor point,
- positioning a middle portion of the said preventer over a clamping arm, preferably on an upper surface thereof, between its pivot point and its free end,
- fixing a second end of the preventer at a second anchor point, and
- tensioning the preventer to thereby exert a downward force on the clamping arm.

By this method there can be achieved a secure positioning of a blade for transportation. In aspects, the clamping arm may preferably be lowered under the action of gravity using a manually operated winding device such as a winch. In this way, the positioning of a blade in a transport frame may, in spite of the large size of the blade and the frame, may be executed by operators preferably without the need for auxiliary equipment. Preferably, a winding device, positioned nearby the clamping arm hinge point may be operated by an operator at a platform in said transport frame, preferably at an operating position thereof. Thereby, both the preventer and the clamping arm may be easily operated, preferably fully manually, by an operator. The method may include tensioning the preventer by actuating a tightening mechanism such as a tensioner at said tip saddle assembly at a said second end of said preventer.

The method of the invention may in particular be applied to transporting one or more wind turbine blades aboard a shipping vessel. The clamping arm and preventer will thereby ensure that accelerations due for example to high waves will maintain the blades secure in the tip saddle.

Preferably, the method may include operating two clamping arms per transport frame. Preferably, there may be provided two said clamping arms per tip saddle assembly. Preferably, each tip clamping arm is operated in the same or in substantially the same manner. Preferably, the tip clamping operation and release operation are performed manually by an operator, preferably using hand tools, preferably without the use of power tools. The provision of two or more such clamping arms at a single tip frame may allow greater scope for using the tip frame in connection with larger blades, susceptible to subject any clamping elements to correspondingly higher loads and stresses. The provision of two or more such arms in particular may allow each respective arm to be closed with a lower force than would be required if only a single arm were employed.

In a further aspect, the method may comprise placing a tip and root portion of a wind turbine blade in a respective tip and root saddle of a first frame pair including a root frame and a tip frame according to the transport frame of the invention. The method may additionally comprise the steps of fixing the blade root in the root saddle and fixing the tip in the tip saddle, and transporting the blade with the tip frame saddle being freely movable in translation, relative to the tip frame, in a longitudinal direction of the blade. By this method, the blade and frame pair may undergo loads or stresses in the longitudinal direction during transportation, without those loads being transmitted to the blade or between the respective frames of a frame pair. By way of example, uneven loads and distortions on a blade and frame pair or on a blade stack can sometimes arise during the course of transportation, such as for example during shipping or during freight transportation by road or rail or by any other means. The method of the invention may improve the stability of a frame pair or stack and/or it may reduce the need for lashing between a frame or frame stack and a transport platform such as the deck of a ship. Moreover, the one or more clamping arm preventer and the one or more clamping arm may better avoid that the blade would break free from its support position during transport.

Additional aspects of the invention including various optional features thereof will be explained with reference to the following non-limiting examples including the following drawings in which:

FIG. 3 shows a perspective view of a transport frame which is a tip frame;

FIG. 4 shows a side view of a transport frame which is a tip frame;

FIGS. 6 and 7 show side views of a tip saddle assembly;

FIG. 8 shows partial views from above a transport frame pair with a blade root and tip region indicated;

FIG. 9 shows a perspective view of a transport frame which is a root frame;

Figure 1:
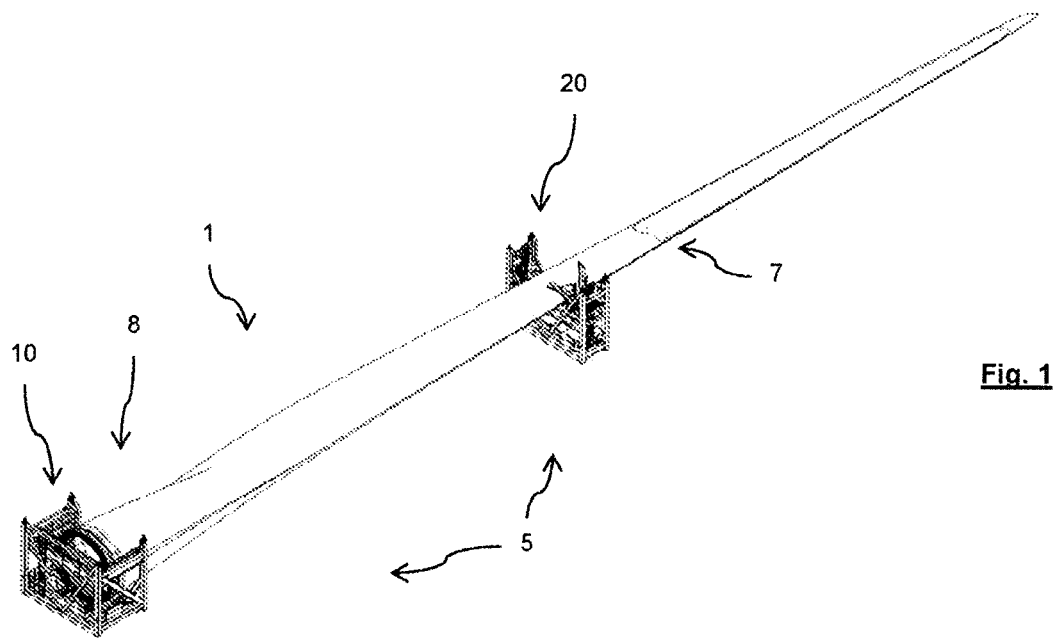
FIG. 1 shows a transport frame pair supporting a wind turbine blade.
Figure 2:
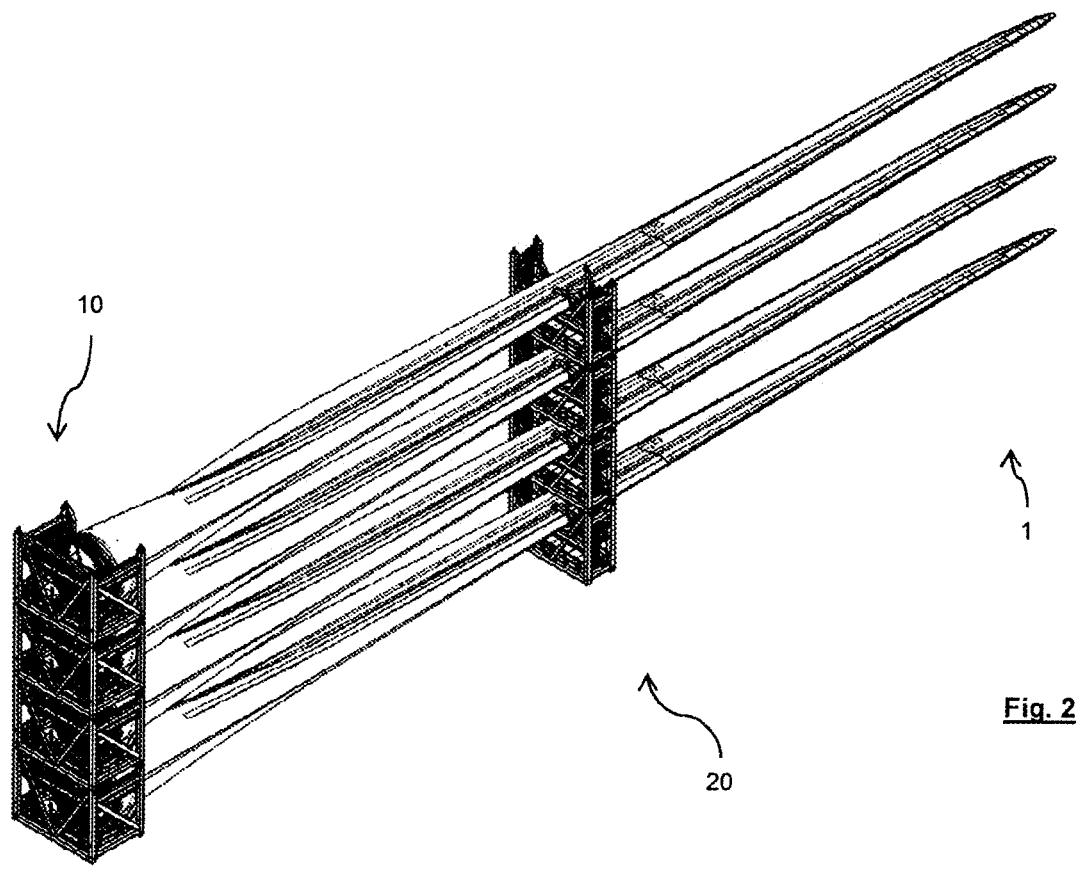
FIG. 2 shows several wind turbine blades supported in a stack of frame pairs.

FIG. 1 illustrates a frame pair consisting of a transport frame 5 in the form of a root frame 10 and a transport frame 5 in the form of a tip frame 20 with a wind turbine blade 1 supported therein in a generally horizontal orientation. A chordwise direction of the blade 1 may also lie generally horizontal when supported in the respective transport frames 5. As is generally understood, the blade 1 extends from a root end to a tip end which may also be correspondingly referred to as a proximal and a distal end respectively. The frames of the frame pair are stackable, as illustrated in FIG. 2. Each root and tip frame 10, 20 includes a respective root saddle assembly 80 and tip saddle assembly 50 as will be described more fully below. In the design illustrated here, each tip- and root frame 20, 10 includes a single respective tip- or root saddle assembly 50, 80. Associated with the respective saddle assembly are additional elements for keeping the respective blade root 8 or tip region 7 securely in place in the respective frame 10, 20. For the purposes of the present context, the tip region 7 may also denote a mid-region of a blade 1. Expressed differently, a tip frame 20 may be positioned anywhere between a mid- and a tip-region 7 of a blade 1.

FIG. 2 illustrates a stacked arrangement of multiple blades 1, with each blade supported in a frame pair 10, 20. The stacked arrangement is achieved by stacking the respective root frames 10 on top of each other and the tip frames 20 likewise. To that end, each of the tip frames 20 and root frames 10 is constructed accordingly, as can be seen for example from FIGS. 3 and 9. Preferably, the frame construction in each case includes rigidly connected frame struts, including upright struts 71, 72, 91, 92 extending between a respective root or tip frame base 75, 95 and a respective root or tip frame top 76, 96. Preferably, these respective upright struts 71, 72, 91, 92 may define respective upright extending corner edges of each transport frame 5. Preferably therefore, respective upright struts may be provided in pairs of proximal upright struts 71, 91 and distal upright struts 72, 92. Lateral struts 74, 94 may extend rigidly between upright struts 71, 91, 72, 92, thereby to define a respective proximal frame portion and a distal frame portion. Lengthwise struts 73, 93 longitudinally connect respective proximal and distal frame portions. In the example illustrated, lengthwise struts 73, 93 extend between proximal upright struts 71, 91 and distal upright struts 72, 92 or between respective proximal and distal lateral struts 74. The respective frame struts of the tip or root frame 20, 10 thereby define a three dimensional interior space. In the example illustrated here, the tip- and root frame 20, 10 each defines an approximately cuboid interior space inside which a respective tip saddle assembly 50 or root saddle assembly 80 is accommodated. The base 75, 95 of the tip and root frames 20, 10 may describe a substantially rectangular footprint in a lateral and longitudinal plane of the frame.

As can be seen from the tip frame 20 illustrated in FIG. 3 and the root frame 10 illustrated in FIG. 9, each frame exhibits a height extent H, a lateral extent W and a lengthwise extent L.

At the top 76, 96 of each tip or root frame 20, 10 there may be provided locating fingers 36 which may co-operate with a recess (not visible in these drawings) at the bottom 75, 95 of the relevant frame. Necessarily, a recess or finger 36 of a first tip or root frame 20, 10 will co-operate to facilitate stacking with the corresponding finger 36 or recess of a similar frame to be stacked atop or beneath.

Stacking frames for storage or stowage, as well as transferring frames off from stacks or onto stacks can be made easier when the effective height dimension $H_t$ of the tip frame 20 of a frame pair is equal to or substantially equal to the effective height $H_r$ of the root frame 10. In this context, the effective height of a frame may correspond to be the distance from a contact surface beneath the frame base 75, 95 on which the frame may rest in e.g. a storage or stowage or transport situation, to the frame top 76, 96, on which a superposed, stacked frame will rest.

Preferably, also the effective width dimension $W_t$ of the tip frame 20 of a frame pair may be equal to or substantially equal to the effective width $W_r$ of the root frame 10. In the present context, the effective width of a frame 5 may correspond to the distance between the outermost surface of a proximal 72, 92 or distal 71, 91 pair of upright struts.

FIGS. 3 and 4 show a tip saddle assembly 50 within a tip frame 20. The illustrated tip saddle assembly 50 comprises a saddle 52 and a saddle support 62. The tip saddle 52 may be configured with a support surface shaped to conform to the shape of a blade surface towards its tip, e.g. in a mid- or tip region thereof. In the illustrated embodiments, the tip saddle 52 is configured to extend between a blade trailing edge 3 and a blade leading edge 2. As can better be seen from FIG. 3, the tip saddle assembly 50 may be supported on longitudinally extending frame struts 73. In particular, the tip saddle support 62 may be supported on longitudinally extending frame struts 73. Preferably, the tip saddle 52 may be slidable in translation in a lengthwise direction of the tip frame 20. This in effect corresponds to a movement of the tip saddle 52 in a lengthwise direction of the blade. Preferably, the tip saddle 52 is capable of sliding freely in the aforementioned lengthwise direction.

A free-running translation movement of a tip saddle assembly 50 may be provided in particular by a sliding connection between the tip saddle assembly 50 and the tip frame 20. In particular, a tip saddle support 62 may be slidable along a track formed or supported by longitudinally extending frame struts 73. The sliding action may be enhanced by providing low-friction surface strips 64 on the tip saddle support 62 at its contact surfaces with the tip-frame 20. Additionally or alternatively, the tip frame 50 may comprise low-friction surface strips on those surfaces which are contacted by the tip saddle support 62. In the example shown, the tip-saddle support 62 is provided with low-friction strips 64. Optionally, the tip-saddle support 62 may be provided with one or more rollers 66 which contact the tip frame 50 to reduce friction during a translation movement of the tip saddle support assembly 50 in the tip frame 50. Preferably, the contact surface at the tip frame 20, on which the tip saddle assembly 50 slides, may be a smooth surface. In the example shown, the tip frame sliding surface may be provided on a longitudinally extending strut 73.

In embodiments, the tip saddle 52 may be tiltable on the tip saddle support 62. In particular, the tip saddle 52 may pivot about pivot points 58 aligned on a pivot axis preferably parallel to the lateral dimension W of the tip frame 20. Preferably, the tilt action allows free tilting movement between the tip saddle support 62 and the tip saddle 52, preferably through an angle of at least five or ten degrees of arc, still preferably at least fifteen degrees of arc, still preferably, between five or ten and thirty degrees of arc, still preferably, between fifteen and thirty degrees of arc.

Figure 5:
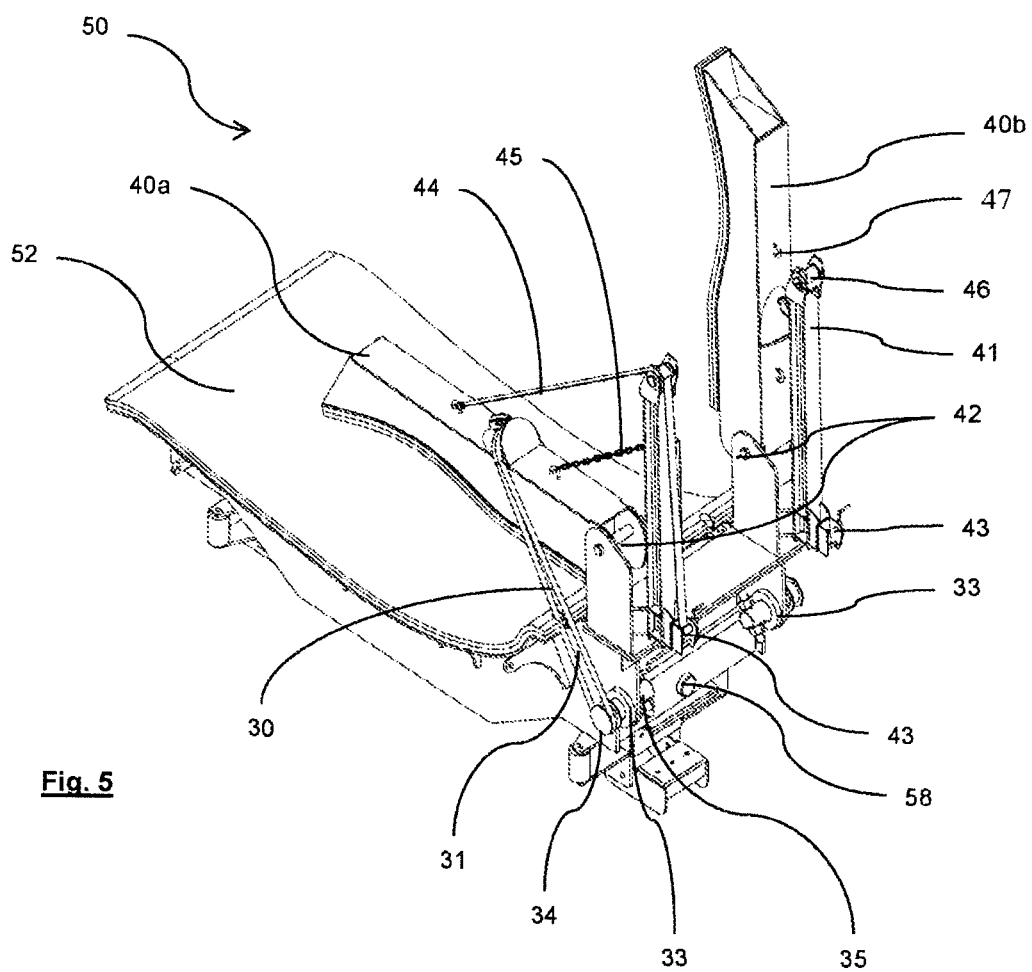
FIG. 5 shows a perspective view of a tip saddle assembly.
Figure 6:
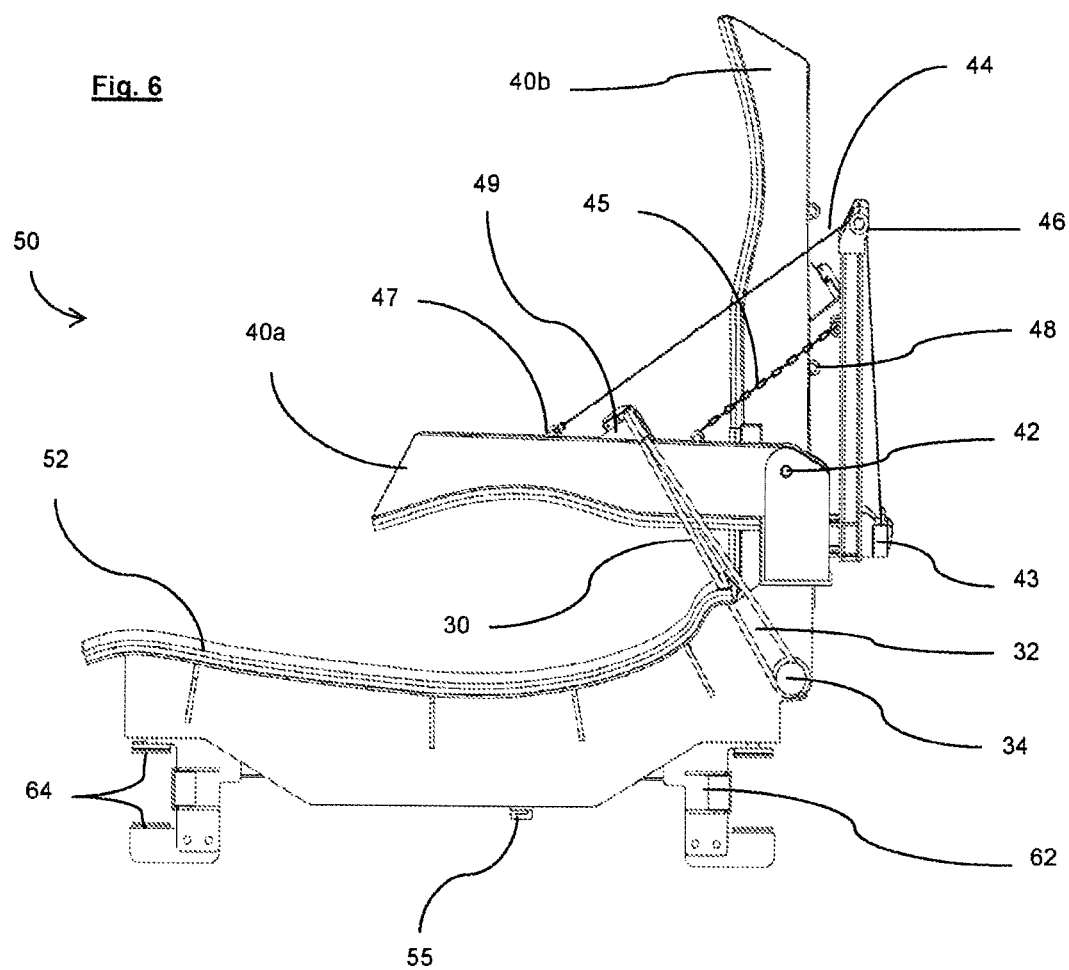

Also shown in FIGS. 3-8 are clamping arms 40 for securing the blade mid- or tip-end on the tip saddle 52 in the tip saddle assembly 50. According to aspects of the invention, one or more such clamping arms 40 may be provided in connection with a tip saddle assembly 50, in particular as part thereof. In the example shown, two clamping arms 40a, 40b are provided in association with each transport frame 5, in particular, associated with each tip saddle 52 and tip saddle assembly 50. A clamping arm 40 may be opened to allow insertion or removal of a blade 1 into or from a tip frame 20. A clamping arm 40 may be closed to keep the blade in place. In aspects of the invention, a first and a second clamping arm 40a and 40b may be provided mounted at a proximal end thereof to a single tip saddle assembly 50, preferably at a hinge point 42. Preferably, the clamping arm hinge point 42 is located in the tip saddle assembly 50 at a side thereof corresponding to a leading edge of a blade 1 to be clamped therein. In FIG. 5, a proximal clamp arm 40a is shown closed, while a distal clamp arm 40b is shown open for illustrative purposes. A raising and lowering apparatus may be provided for operating the clamping arms 40. In particular, the raising and lowering apparatus may comprise a winding device 43 such as a motorised or manually driven winch or other equivalent. Preferably the winding device 43 may be manually operable by an operator to effect opening or closure of a clamp arm 40 preferably using no tools or using only hand tools. The provision of more than one clamping arm 40 at a tip saddle assembly may allow for larger blades to be effectively clamped in a tip saddle assembly 50 while at the same time keeping each clamping arm 40 down to a size and weight such as to allow manual operation by an operator, preferably using tools such as hand tools and preferably not using power or powered tools.

Preferably, the winding device 43 may be associated with a flexible line 44 in the form of a cable or rope or chain or equivalent. Preferably, said line 44 is fixed to said clamping arm 40 at a line anchor point 47 at or near a middle portion thereof or preferably between a middle portion and a distal portion thereof.

In aspects of the invention, the winding device 43 may be associated with a block 46 such as a pulley or roller. Preferably, said block 46 may be in a raised position in relation to the winding device 43 or hinge pint 42. Preferably, said block 46 is positioned on a raised arm 41, preferably atop thereof. Preferably, the raised arm 41 is connected at a base thereof to the tip saddle assembly 50. Optionally, the block 46 may be positioned on another part of the tip frame 20, such as on a frame strut thereof and at a raised position in relation to the tip saddle assembly 50. Preferably, the block 46 is positioned on said raised arm 41 or at another part of said tip frame 20 at a height such that in a raised position of a corresponding clamping arm 40, the anchor point 47 lies at a height below said block 46 or at a height close to the height of said block 46.

Preferably, the winding device 43 may be positioned proximate to the hinge point 42. The proximity of these two elements allows easy operation by an operator, in particular, an operator positioned at an operating position 24 on a platform 25 arranged between the tip saddle assembly 50 and the outer framework struts of the tip frame 20. The platform 25 preferably runs alongside and beneath a hinge point 42 side of the tip saddle assembly 50. In embodiments, the platform 25 is preferably sufficiently wide and sufficiently nearby said tip saddle assembly 50 and said operable elements thereof to allow an operator full access to all those operable elements of a tip frame 20, or in particular of a tip saddle assembly 50, which may be required for securely placing a blade in said tip saddle assembly 50 or for releasing a said blade 1 therefrom.

A guy 45 may be fitted between a clamping arm 40 and the tip frame 20 in order to prohibit a lowering of the clamping arm 40 below a given angle. This will avoid potential damage to the clamping arm 40 or tip saddle 52 in the event that the winding device 43 would let out too much clamping arm line 44. Hence, and inadvertent release of a winding device 43 would not lead to a heavy clamping arm 40 falling onto and possibly damaging the saddle 52. In the example shown, a guy 45 is fixed at a first end to the raised arm 41 of the tip saddle assembly 50 and at a second end to a guy anchor point 48 on the clamping arm 40. Preferably, the guy anchor point 48 may lie on an upper surface of a clamping arm 40. Preferably, the guy anchor point 48 may lie between a distal end and a proximal end of a said clamping arm 40. Preferably, the guy anchor point 48 may lie between a mid-portion and a proximal end of a said clamping arm 40.

A clamping arm preventer 30 is provided for keeping a clamping arm 40 in a closed, or lowered, position, in particular in a clamping position of a blade 1 positioned therein. In the illustrated embodiment, the preventer 30 has a mid-portion in between a first end and a second end. The mid-portion is passed over a portion of a clamping arm 40 between its free, distal end and its proximal, hinged end and, when placed under tension, acts to apply a downward force to the clamping arm 40, in particular, when the clamping arm 40 is in a lowered position, especially on a blade 1.

To achieve this, the preventer 30 is attachable to a fixing 33, preferably connected to the tip saddle assembly 50 or to another location at the tip frame 20. The preventer 30 may be a strop of cable or rope or strap or other flexible inextensible element. It may be of inextensible or high tensile material such as a metallic material or a non-stretch polymeric material such as a polyamide, polyaramid or UHMWP material. A first end 31 and a second end 32 may be attached to a preventer fixing 33. Preferably, the preventer fixing 33 may be positioned proximal, nearby or adjacent the clamping arm hinge point 32, and preferably at least sufficiently close to be loaded with a preventer 30 by a same operator who may operate a winding device 43, without leaving an operating platform 25 inside the transport frame 5. Optionally, a fixing 33 may comprise at least a first 34 and a second 35 anchor point. In particular, a first preventer end 31 may be securable to a first anchor point 34, while a second preventer end 32 may be securable to a second anchor point 35, preferably by an operator occupying a same operating position 24 at a platform 25 as required for operating a winding device 43. A tensioner 39 may be provided for imparting a tension to the preventer 30 when secured in place. The illustrated tensioner 39 is associated with the fixing 33, in particular with a second anchor point 35 thereof. In other embodiments, a tensioner may be provided along the preventer 30, for example in the form of a ratchet lever. Preferably, the tensioner 39 is located at a position such that it can readily be operated by an operator at a same operating position 24 as required for operating the winding device 43 or preventer 30. The illustrated tensioner, best seen in FIG. 7, comprises a catch for engaging a second end 32 of the preventer 30 and a tension adjustment member connected to the fixing 33, in particular to a second anchor point 35 thereof. The tension adjustment member of the tensioner 39 which is illustrated has a threaded shank 29 and an adjustment nut at the fixing 33. By tightening or loosening the adjustment nut, an operator may apply tension to, or release tension from, the preventer 30. The same effect may be achieved using a ratchet lever tensioner of a known type or other equivalent means. Preferably, the tensioner 39 may be operated using hand tools preferably without requiring powered tools or equipment. In alternative embodiments, a shank 29 of the tensioner 39 may be engaged in a threaded anchor point 35 of a preventer fixing 33 such that its effective length between the fixing 33 and the second end 32 of the preventer 30 is adjustable. In this embodiment, the tensioner catch to which the end 32 of the preventer 30 is connected may be mounted to swivel on the shank 29.

The tip saddle assembly 50 may in particular comprise a frame to which the tip saddle 52 and to which the hinge point 42 are fixed. Additional elements may be fixed thereto including, as discussed, a preventer fixing 33 or a raised arm 41 or a block 46 or a winding device 43 or an additional clamp arm 40 and hinge point 42. The tip saddle assembly 50 may be inhibited or blocked against its free translation movement in the tip frame 20. This may be achieved by applying a blocker 56 (see FIG. 4) capable of blocking relative movement between the tip saddle assembly 50 and the tip frame 20. The blocker 56 may be rigid such as a locking rod or flexible, such as a preferably inextensible strap, line, cable or rope. In FIG. 4, a blocker 56 is shown in the form of a flexible strap. Preferably, a blocker 56 may be attachable to attachment points arranged at the tip saddle assembly 50, preferably at a tip saddle support 62 thereof. A blocker 56 may thus extend at a first end from an attachment point 55 at a tip saddle assembly 50 to another attachment point 55 at a second end of the blocker 56, the attachment point 55 being at the tip frame 20, optionally at a laterally extending strut 74 thereof. The blocker 56 may be fixed in any suitable way, at respective first and second ends. The blocker 56, may be of inextensible material such as a metallic material or a non-stretch polymeric material such as a polyamide, polyaramid or UHMWP material. When fixed to attachment points 55 respectively at the tip frame 20 and at the tip saddle assembly 50, the blocker 56 may thus be brought under tension, ensuring that a translation movement of the tip saddle assembly 50 is thereby prohibited in at least one direction parallel to a lengthwise axis of the frame pair. In one embodiment, a blocker 56 may be attached at first and second, opposite ends to respective attachment points 55 at the tip saddle assembly 50 and at the tip frame 20. In this arrangement, the blocker 56 may be applied by tensioning it, with the tip saddle 52 in its desired location in the tip frame 20. It may be released by releasing the tension, thereby freeing the tip saddle assembly 52 to move in the lengthwise direction of the tip frame 20. In addition, in embodiments, a blocker 56 may comprise a disengageable connector at either or both its first and second ends. The blocker 56 may thereby be disengaged from the attachment points 55 at one or both ends thereof. In embodiments, a blocker 56 may thereby be removably attachable to the tip frame 20. In one aspect, a disengageable connector at a blocker 56 may comprise a hook (not shown) capable of being engaged with or disengaged from an attachment point 55. In embodiments, a blocker 56 may comprise a hook at a first and second end thereof capable of being disengageably connected to a respective attachment point 55 at a tip frame strut and at a tip saddle assembly 50. Preferably the application or disengagement of a blocker 56 may be carried out manually by an operator. Preferably the act of tensioning a blocker 56 may be carried out manually by an operator. Preferably either or both actions may be performed without power tools.

FIG. 8 illustrates a blade 1 with its root portion 8 in a root transport frame 10 and a blade mid-portion 7 in a tip transport frame 20. The blade 1 is shown lying substantially horizontally with its chordwise extent at a mid-portion 7 thereof also directed in a generally horizontal direction. In the embodiment illustrated, the free end of a closed clamping arm 40 reaches across the blade longitudinal main axis and extends approximately half way across the chordwise extent of the blade in the tip saddle assembly 50. An operator in an operating position 24 on a platform 25 in the tip transport frame 20 is able to reach all the relevant controls for installing or releasing a blade 1 into or from the frame.

As shown in FIG. 9, a root saddle assembly 80 is provided in a root frame 10 of a frame pair. The root saddle assembly 80 is in particular preferably connected to the root frame 10 in such a way that translation movement of the root saddle assembly 80 relative to the root frame 10 is excluded. A root saddle 82 may be configured with a support surface shaped to conform to the shape of a blade surface at its root. The root saddle 82 may thereby appropriately have an arcuate blade root support surface. In the example shown, the root saddle 82 maybe tiltable in the root frame 20. The root saddle assembly 80 may include clamps or clamp attachments or other fittings for securely holding the blade root in the root saddle 80. These may be in the form of brace attachments and/or in the form of root restrainers. Root restrainers may in particular be configured to be attached to stud-bolts protruding from a blade root and thereby prohibit longitudinal movement of a blade 1 in a root frame 10.

In accordance with aspects of the invention, it is preferred for the root frame 10 of a pair to have an effective length $L_r$ greater than the effective length $L_t$ of the tip frame 20. In this context, the effective length of a frame 5 may correspond to the distance between the most proximal surface of a proximal upright strut 72, 92 and the most distal surface of a distal upright strut 71, 91. Still preferably, the effective length $L_r$ of the root frame 10 of a frame pair may be at least twenty percent greater than the effective length $L_t$ of the tip frame 20. Still preferably, the effective length $L_r$ of the root frame 10 of a frame pair may be at least thirty percent greater than the effective length $L_t$ of the tip frame 20. Still preferably, the effective length $L_r$ of the root frame 10 of a frame pair may be at least forty percent greater than the effective length $L_t$ of the tip frame 20. The stability of a root frame 10 or root frame stack may thereby be further enhanced. Moreover, the overall stability of a frame pair or of stacked frame pairs may thereby be enhanced owing to the increased propensity for load dissipation through the root frame 10 or root frame stack while underway. The larger lengthwise dimension of a root frame may furthermore reduce the need for lashings between a transport surface and a root frame 10 or root frame stack. In this context, it may be appreciated that the internal volume defined by a tip frame 20 may preferably be at least twenty percent less or at least thirty or forty percent less than the internal volume defined by a root frame 10.

In use, an operator may first enter an unoccupied tip transport frame 20 which contains no blade 1, and gain access to a platform 25 therein, from which the tip saddle assembly may be accessed. In this position, each clamping arm 40 may either already be raised, or it may be in a lowered position with no blade 1, perhaps suspended by the guy 45, with the winch line 44 slackened. Once at an operating position 24 on the platform 25, the operator must therefore ensure that each clamping arm 40 is in a fully raised position. In the case where there are two clamping arms 40a, 40b as illustrated, it is necessary for both of these to be fully raised. This may be achieved by operating the winding device 43, preferably manually, until the winch cable 44 is fully wound in, possibly leaving the winch line anchor point 47 close to the winch line block 46, i.e. at approximately the same height at the block 46. A blade 1 may then be lowered, preferably by crane, into the tip saddle 52 such that it is snugly accommodated therein. The operator may then once again operate the respective winding device 43 to lower each clamping arm 40 into a lowered, clamping position. With the hinge point 42 set back in a proximal direction of the tip saddle 52 and tip saddle assembly 50, such that its centre of gravity lies in a vertically distal position in relation to the hinge point, even when fully raised, i.e. more or less upright, the clamping arm 40 will tend to descend under gravity to its lowered position. Optionally, there may be a hinge blocking element at the hinge point 42 ensuring that the freedom of movement of the clamping arm 42 is restricted such that it cannot move to a position in which its centre of gravity would lie vertically proximal of its hinge point 42. The winding device 43 may be geared, to allow an operator to apply a braking force during winding, enough to prevent the clamping arm 40 from crashing uncontrolled downwards. Alternatively or additionally, the winding device 43 may include a brake, preferably a manual brake, enabling a controlled unwinding of the winch line 44 during lowering of a clamping arm 40. When in a lowered position, each clamping arm 40 may rest on the blade top surface. Thereafter, a preventer 30 may be installed. This may be achieved by ensuring that a mid-portion of the preventer 30 lies over a clamp arm 40, preferably over a boss 49 thereon. A second end 32 of the preventer 30, preferably associated with a tensioner 39, may be connected to a fixing 33, optionally to a second anchor point 35 thereof. At this point, a tensioner 39 should be in a generally extended or released setting, providing a little additional length to the preventer 30 such that a first end 31 thereof, which may be in the form of a noose, may be passed over the fixing 33, preferably a first anchor point 34 thereof. With both ends 31, 32 of the preventer 30 in place, the tensioner 39 may be operated by an operator to thereby apply tension to the preventer, pulling with a downward force on the clamping arm 40. This process is repeated for each clamping arm 40. With the clamping arm(s) 40 (40a, 40b) securely in place, the blade 1 is thereby securely restrained in the tip saddle assembly 50 of the transport frame and may be transported or stored as appropriate. If required, the blocker 56, which is preferably securely applied for restraining longitudinal movement of the tip saddle assembly 50 during installation of the blade 1, may be released during transportation, to thereby relieve stress on the blade 1 which may arise as a result of e.g. big waves during shipping. For unloading a blade 1 from a tip transport frame 20, it may be preferred to engage the blocker 56. An operator, again at the operating position on the platform 25, may first release the preventer 30 by loosening a tensioner 39 before easing an end of the preventer 30 off its fixing 33. This should be repeated for each clamping arm 40, after which a respective winding device 43 may be actuated for raising each clamping arm 40 before the blade may be removed.

The examples illustrated herein show a variety of optional features not all of which need to be combined together in the context of the invention. On the other hand, all and any recited features may be combined together unless prevented by the laws of physics or unless manifestly impossible for another reason.

The invention claimed is:

1. A transport frame having a longitudinal, lateral and upright extent, and being configured for receiving a tip portion of a longitudinally extending wind turbine blade, said frame being stackable with identical frames, said frame having a tip saddle assembly comprising a saddle with a support surface shaped to receive a blade tip with its chordwise extent lying approximately horizontal, and a clamping mechanism having a hinged clamping arm configured to be operable between a raised, open position and a lowered, closed position;
   said clamping arm, when open, allowing a blade tip to be lowered into said saddle with its chordwise extent generally horizontal, and when closed, securely restraining said blade tip against upward movement;
   said clamping arm extending between a hinge point and a free end;
   said tip saddle assembly further including a preventer serving to maintain said clamping arm in said closed position over a blade and which preventer has a middle portion extending between a first end and a second end; and
   wherein said tip saddle assembly further includes a fixing for respective said first and second ends of said preventer;
   said tip saddle assembly being configured such that said preventer exerts a downward force on said clamping arm when the middle portion thereof passes under tension over a portion of said clamping arm between said hinge point and said free end, and wherein said preventer is anchored at said first and said second ends to said tip saddle assembly.

2. The transport frame according to claim 1, wherein said clamping arm has a boss on an upper surface thereof between said pivot point and said free end, said boss preferably being configured to receive a middle portion of said preventer and to retain same in place when said preventer is under tension.

3. The transport frame according to claim 1, wherein said preventer fixing is located at said tip saddle assembly proximate said hinge point and in fixed relation to said tip saddle.

4. The transport frame according to claim 1, wherein said first end of said preventer is fixable at said preventer fixing at said tip saddle assembly whereas said second end of said preventer is adjustably fixed said preventer fixing at said tip saddle assembly.

5. The transport frame according to claim 1, wherein said preventer comprises a tensioner capable of applying tension thereto when said first and said second end are respectively anchored.

6. The transport frame according to claim 5, wherein said tensioner is a ratchet lever.

7. The transport frame according to claim 5, wherein said tensioner comprises a tightening mechanism at said preventer fixing of said tip saddle assembly, in particular at an anchor point thereof.

8. The transport frame according to claim 1, wherein said preventer fixing comprises a respective first and second anchor point for each said first and second ends of said preventer.

9. The transport frame according to claim 1, further comprising a mechanism for raising or lowering said clamping arm by means of a cable winding device of said clamping mechanism.

10. The transport frame according to claim 9, wherein a winch cable runs from said winch up over a raised runner and descends to an attachment point on said clamping arm.

11. The transport frame according to claim 1, wherein a lowering action of the clamp arm is driven by gravity.

12. The transport frame according to claim 1, wherein said cable winding device is located proximate said clamping arm hinge point.

13. The transport frame according to claim 1, wherein an inextensible, flexible guy runs down to a fixing point on said clamping arm to prohibit a lowering of said clamping arm below a predetermined level or angle.

14. The transport frame according to claim 1, wherein said tip saddle assembly is freely movable in translation relative to said frame, in a lengthwise direction of said frame.

15. The transport frame according to claim 1, wherein said tip saddle assembly comprises two said clamping arms spaced in a lengthwise direction of said frame, each clamping arm being associated with a respective said preventer and a respective said preventer fixing.

16. The transport frame according to claim 1, further comprising an operator access platform proximate to said hinge point.

17. The transport frame according to claim 1, wherein said free end, in a closed position of said clamping arm, reaches across less than the full chordwise extent of the said saddle or blade when supported thereon.

18. A method for clamping a mid- or tip-region of a wind turbine blade in a transport frame according to claim 1, said method including
placing said clamping arm in said open position,
placing a portion of said blade on said tip saddle,
lowering said clamping arm over said blade,
connecting or fixing a first end of said preventer at a preventer fixing,
positioning a middle portion of said preventer over said clamping arm,
fixing a second end of said preventer at said preventer fixing, and
tensioning said preventer to thereby exert a downward force on said clamping arm.

19. The method according to claim 18 further including lowering said clamping arm under the action of gravity using a winding device.

20. The method according to claim 19, wherein said winding device is positioned nearby said clamping arm hinge point.

21. The method according to claim 18, further including fixing said preventer to said tip saddle assembly nearby said clamping arm hinge point.

22. The method according to claim 18 including tensioning said preventer by actuating a tightening mechanism at said tip saddle assembly at a said second end of said preventer.

23. The method according to claim 18 further including transporting said wind turbine blade aboard a shipping vessel.

24. The method according to claim 19, further including opening said tip saddle assembly by actuating said winding device to move said clamping arm into said open, raised position.

25. The method according to claim 18, wherein said clamping arm is a first clamping arm and wherein said method additionally includes operating a second clamping arm in the same way as the said first claiming arm, said second clamping arm being provided in association with said tip saddle assembly.

* * * * *